United States Patent [19]

van Linden et al.

[11] 4,128,415
[45] Dec. 5, 1978

[54] ALUMINUM SCRAP RECLAMATION

[75] Inventors: Jan H. L. van Linden, Allison Park, Pa.; Raymond J. Claxton, Dallas, Tex.; Joseph R. Herrick, Verona; Robert J. Ormesher, Allegheny Township, Westmoreland County, both of Pa.

[73] Assignee: Aluminum Company of America, Pittsburgh, Pa.

[21] Appl. No.: 859,060

[22] Filed: Dec. 9, 1977

[51] Int. Cl.² ............................................. C22B 21/06
[52] U.S. Cl. .................................. 75/65 R; 75/68 R; 266/44; 266/901
[58] Field of Search ............. 75/68 R, 65 R; 266/901, 266/44

[56] References Cited
U.S. PATENT DOCUMENTS

| 3,984,234 | 10/1976 | Claxton et al. | 75/68 R |
| 3,997,336 | 12/1976 | Van Linden et al. | 75/68 R |

*Primary Examiner*—M. J. Andrews
*Attorney, Agent, or Firm*—Andrew Alexander

[57] ABSTRACT

An improved system for melting metal scrap in a molten melting media includes a housing generally cylindrical in cross section and having upper and lower portions. Metal scrap is introduced to a body of molten melting media contained in the upper portion of the housing. A supply of molten melting media is added to the upper portion of the housing through a volute located in the lower portion. The molten melting media is supplied or added by action of an impeller located in the lower portion and mounted on a drive shaft extending through the upper portion. Vanes are mounted on the drive shaft to control the flow motion of the body of molten melting media and metal scrap in the upper portion of the housing by creating a vortex in this body for purposes of mixing the melting media and metal scrap. An opening is provided in the upper portion to remove melted scrap and melting media at a rate substantially commensurate with their rate of introduction.

8 Claims, 5 Drawing Figures

ALUMINUM SCRAP RECLAMATION

INTRODUCTION

This invention relates to an improved scrap reclamation system and in particular to a method and apparatus for quickly and efficiently melting metal scrap in a recirculating melting system.

Increased effort is being placed on finding cheaper methods to recycle metal scrap, particularly in the light metals field. This effort is being expended because of the national and international concern over depletion of raw material sources for these metals.

Recycling systems for metal scrap are normally required to be at least competitive with established manufacturing systems for producing such metal. To be competitive, such recycling systems must be efficient which can often require that they be designed to reclaim certain or specific kinds of metal scrap. With respect to the kinds of metal scrap encountered in the light metals field, particularly aluminum, it should be observed that it can range from scrap generated very early in the manufacturing process to that resulting from used products, e.g. metal containers. Scrap generated early in the manufacturing of aluminum, for example, is scalping chips. These chips result from preparing the surface of an aluminum ingot for rolling or cladding or some such purpose when often large irregularities are removed. Chips removed at this time can constitute as much as 6% of the total metal in the ingot and therefore obviously can amount to a considerable amount of metal which can be recycled. Scrap typical of used metal containers which can be beneficial to recycle is metal beverage cans and the like. Recycling such cans serves to conserve resources and also to provide a cleaner environment.

These two types of scrap are often considered to present different problems from the standpoint of reclamation. For example, container or can scrap normally comprises bits and pieces of metal which can range in size from relatively small particles to crushed cans. Often the cans have holes pierced in them for purposes of delacquering using solvents. The pierced holes, while aiding the flow of solvent through the mass of cans, result in jagged edges which, together with the generally non-uniform shapes and sizes of crushed cans, make this scrap relatively non-flowable. Furthermore, such scrap tends to be rather buoyant with respect to the melting media, requiring special equipment to forcibly submerge it. A particular type to equipment for handling this type of scrap is disclosed in U.S. Pat. No. 3,873,305 where a rotating wedge forcibly submerges this type of scrap into the melting media. In the system described in this patent, additional equipment is required to recirculate the molten melting media.

With respect to the scalping chips, or scrap which may be characterized as flowable, for example, such as filings and cuttings or even large pieces, these often do not present great difficulty in submerging as does the above-mentioned container scrap. Nevertheless, it is imperative that such flowable scrap be melted and reclaimed in the most efficient manner in order to provide an incentive to operate a remelting system as a source of metal, as compared to the established manufacturing system for producing such metal.

With highly oxidizable metals, such as aluminum, out of which the aforementioned containers and beverage cans are often made, it is important to provide a remelting system which provides maximum heat transfer for efficient melting. Also, it is important that the metal scrap be submerged with minimum turbulence at the melting media surface in order to minimize oxidation of the molten metal. Oxidation leads to skim formation, a problem inherent in most systems reclaiming highly oxidizable metals such as aluminum.

The skim referred to includes the metal oxide, e.g. $Al_2O_3$, and molten metal which becomes entrained in such oxide. Skim is undesirable and therefore should be minimized not only because of the molten metal lost to it, but also because it can cause problems by acting as an insulator in the heating bay. That is, when combustion units discharging their heat on the surface of the molten media in the heating bay are used, skim floating on the surface thereof makes it difficult to heat the molten media. Also, such floating skim by rejecting heat can seriously shorten the useful life of the equipment by causing it to overheat.

The present invention provides a highly efficient method for reclaiming metal scrap in a recirculating melting system. The method is suitable for reclaiming either flowable or non-flowable scrap of the type referred to above.

SUMMARY OF THE INVENTION

An object of the present invention is to provide a highly efficient recirculating melting system for reclaiming metal scrap.

These and other objects will become apparent from a reading of the disclosure and claims and an inspection of the drawings appended hereto.

Accordingly, there is disclosed an improved system for melting metal scrap in a molten melting media. The system includes a housing generally cylindrical in cross section and having upper and lower portions. Metal scrap is introduced to a body of molten melting media contained in the upper portion of the housing. A supply of molten melting media is added to the upper portion of the housing through a volute located in the lower portion. The molten melting media is supplied or added by action of an impeller located in the lower portion and mounted on a drive shaft extending through the upper portion. Vanes are mounted on the drive shaft to control the flow motion of the body of molten melting media and metal scrap in the upper portion of the housing by creating a vortex in this body for purposes of ingesting the metal scrap in the melting media. An opening is provided in the upper portion to remove melted scrap and melting media at a rate substantially commensurate with their rate of introduction. Thus, in operation of the system, scrap is contacted by the melting media in the upper portion for melting purposes. Thereafter, the combination is removed through an opening in the upper portion to a fluxing bay, for example.

DETAILED DESCRIPTION OF THE PREFERRED EMBODIMENTS

Figure 1:
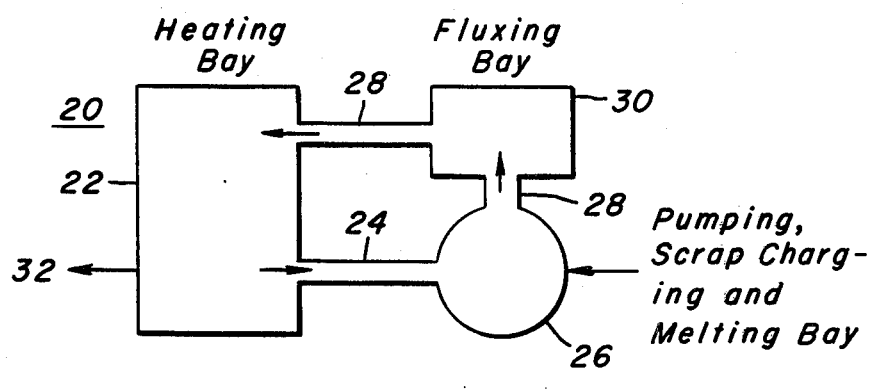
FIG. 1 is a plan view showing a general schematic of a circulatory system in accordance with the present invention.

Referring now more specifically to FIG. 1, there is shown a schematic of a circulatory melting system 20 incorporating the present invention. In the circulatory melting system 20, molten melting media is circulated from the heating bay 22 along line 24 to a bay 26 wherein pumping, scrap charging and melting is accomplished simultaneously. Thereafter, the melt is circulated back to the heating bay 22 via line 28 which can pass through a fluxing bay 30. The heating bay can have a discharge line 32 which in the circulatory system can discharge molten metal at a rate commensurate with the feed rate of scrap to bay 26. This type of circulatory system is highly efficient in its use of heat input and in its freedom from skim generation, particularly when used in conjunction with fluxing bay 30.

The melting media may be heated in heating bay 22 by combustion units discharging their heat upon its surface. Alternatively, electric induction or resistance heaters immersed in the molten media may be used.

The melting media can be molten metal of similar composition to the metal charge or it may be a molten salt. If a molten salt is used, a salt-metal separation would normally be necessary to facilitate the removal of the melted metal. When molten aluminum is the melting media, a typical temperature leaving the heating bay 22 is about 1400° F. although this temperature can range from 1325° to 1475° F. but with a higher temperature there is a greater tendency to form skim. A typical temperature re-entering heating bay 22 is about 1300° F. This provides about a 100° F. temperature drop across the melting bay to provide heat to melt the charge.

Figure 2:
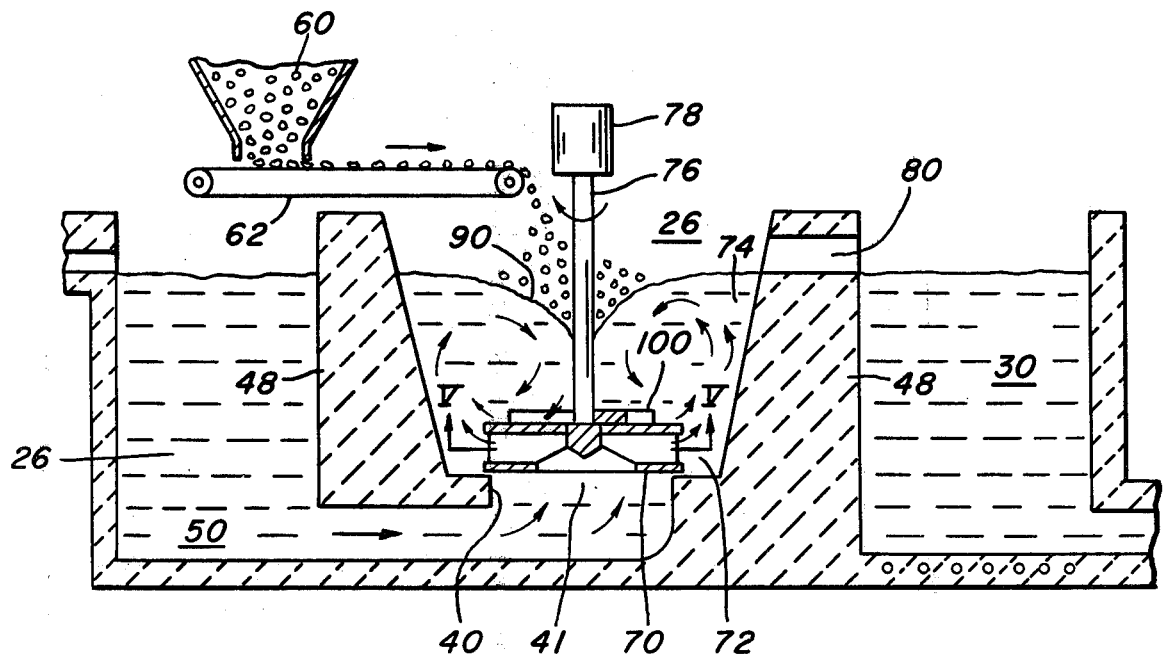
FIG. 2 is an elevational view in cross section illustrating a bay in the melting system wherein scrap charging, melting and pumping of the melting media is accomplished more or less simultaneously.

Referring now to FIG. 2, there is shown bay 26 which allows for charging metal scrap 60, for circulating molten melting media 50 and melting of metal scrap, all of which can occur simultaneously. As will be noted, bay 26 is preferably generally circular in cross section and can be generally cylindrical in shape or may have walls 48 which are downwardly, converging, as illustrated in FIG. 2.

In operation, molten melting media 50 is circulated from heating bay 22 to bay 26 and back to the heating bay by means of a rotating impeller, generally referred to as 70. The action of impeller 70 located in lower portion 72, as well as providing circulation in the system, draws melting media up into upper portion 74 of bay 26. That is, impeller 70 continuously replenishes the body of melting media 50 contained in bay 26. Scrap 60 is fed along an endless belt 62 into bay 26 where it is ingested by the molten melting media 50. The combination of melting media and molten metal from the melted scrap is removed from bay 26 through opening 80 located in upper portion 74 of bay or housing 26. The removal is at a rate substantially commensurate with the rate of their introduction thereto. The combination may be introduced to a fluxing bay, for example, as shown in FIG. 2 for purposes of removing skim or dross.

It will be observed from FIG. 2 that the metal scrap is ingested and melted in bay 26 free from problems of metal scrap becoming wedges in the impeller or becoming wedged between the impeller and volute wall 40. That is, it will be observed by inspection of bay 26 that in spite of the melting media being drawn up through the lower portion 72 of bay or housing 26, the flow of molten melting media is controlled so as to provide vortex 90. The vortex is effective in forcibly submerging or ingesting metal scrap into the melting media. The flow of molten media introduced by impeller 70 is controlled by vanes 100 projecting from drive shaft 76. Vanes 100 shown in FIG. 2 are mounted on drive shaft 72 substantially adjacent impeller 70. However, it should be noted that vanes 100 may be mounted on shaft 72 so as to be spaced apart from the impeller. Thus, rotation of drive shaft 76 by motor 78 serves to both introduce or replenish melting media 50 in bay 26 by action of the impeller and to create a vortex and therefore provide efficient ingestion and melting of metal scrap by action of vanes 100.

From FIG. 2 it will also be seen that the melting media in bay 26 is shown generally as being pulled downwardly in the vicinity of the drive shaft by action of vanes 100 and as being pushed upwardly in the general vicinity of wall 48. It should be noted that this may be a somewhat simplified representation of the flow pattern of the melting media in the vortex. That is, in addition to the up and down flow illustrated, there is substantial circular flow resulting from the action of impeller 70 and vanes 100.

Figure 3:
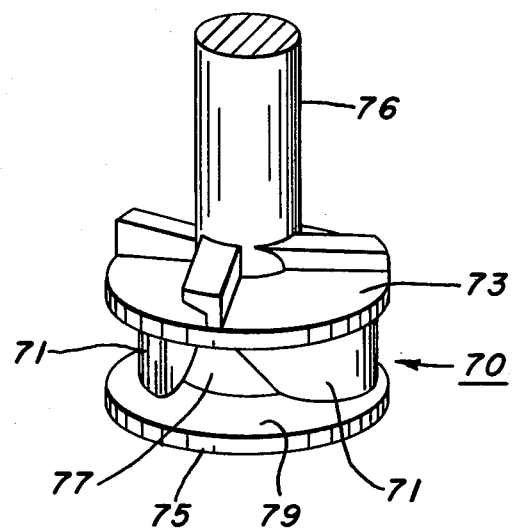
FIG. 3 is a dimensional view of impeller and drive shaft shown in FIG. 2 illustrating vanes projecting from the shaft for purposes of creating a vortex in the melting media.
Figure 4:
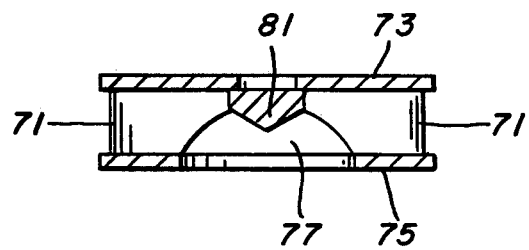
FIG. 4 is an elevational view in cross section of the impeller.
Figure 5:
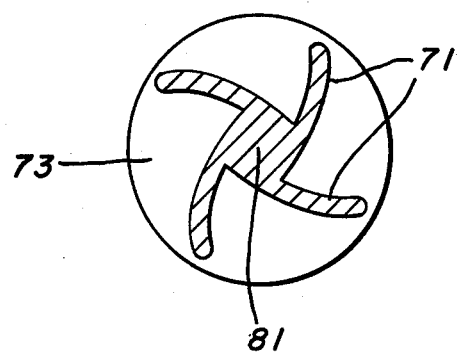
FIG. 5 is a plan view of the impeller taken along line V—V of FIG. 2.

A preferred impeller and vanes which have been found to be highly suitable for the operation of both continuously replenishing the body of molten media in bay 26 and creating a vortex therein is illustrated in FIG. 3. Impeller 70 has blades 71 mounted on a substantially circular disc 73. Blades 71 extend substantially perpendicularly from disc 73 and are joined to a flat ring member 75. From FIG. 4 it can be seen that central area, referred to as 77, of blades 71 is removed to increase the efficiency of the impeller. It will be understood that in operation of the impeller molten media enters central area 77 more or less axially and is expelled radially by virtue of the impeller design. Also, in the preferred embodiment of impeller 70, blades 71 extend from a central hub 81 in a generally radial direction and, as shown in FIG. 5, have a curved configuration which aids in the impeller efficiency.

Ring member 75 performs an important function in the impeller of the present invention. That is, ring member 75 acts to ensure that the flow of molten metal is first directed to the low energy part of the impeller in order to impart a relatively high radial velocity or discharge of molten media. It will also be understood that inside surface 79 of ring member 75 also resists downward movement of molten media exiting radially, resulting in higher efficiency of the impeller. Thus, ring member 75 permits bottom opening 41 (FIG. 2) to have a much larger extent. That is, in conventional systems opening 41 is usually much smaller than the extent of the impeller in order to direct the molten media towards the center of the impeller. One of the problems with having an opening 41 smaller in extent than the impeller is that the opening can become blocked. Even though not clearly understood, it has been discovered that providing the smaller opening for directing molten media into the impeller results in freedom from blocking.

By an inspection of FIG. 2, it will be observed that impeller 70 can be withdrawn upwardly out of housing 48 with any one of a number of systems suitable for that purpose. Hence, if the impeller becomes inoperative, it can be replaced very quickly. Thus, in a circulatory system such as this, there is a certain degree of freedom from concern over freezing of the melting media.

In the invention as presently set forth, it is preferred to avoid extensive scrap accumulation on the surface of the molten melting media in bay 26. Rather, it is preferred to have the scrap consumed or ingested more or less as it is discharged from the conveyor belt into the melting media. Having an accumulation of scrap in bay 26 can lead to scrap metal discharging from the bay before being melted. Thus, while some accumulation can be tolerated, it is preferred that the discharge rate of scrap feed be synchronized with that of the rate of flow of the molten melting media such that virtually no accumulation takes place. If accumulation is observed, it may be remedied by increasing the rpm of the impeller thereby causing greater flow of molten melting media. Alternatively, the rate of scrap feed can be decreased or a combination of these may be used.

In the present system, materials of construction of bay 26 can be any material suitably resistant to erosion of corrosion by molten aluminum or molten salts. Such materials include silicon carbide or any other refractory normally used with molten aluminum. With respect to the impeller, since dimensions can be relatively imprecise when compared to pumps normally used to pump molten metals, e.g. no seals, etc., the impeller and shaft can be cast. Alternatively, if the fabricating material is graphite, the impeller assembly can be conveniently machined. Preferably, the impeller 70 and shaft 76 are fabricated from a refractory material comprising a zinc borosilicate frit. A particularly suitable zinc borosilicate frit is described in U.S. application Ser. No. 759,984, hereby incorporated by reference.

While the invention has been described in terms of preferred embodiments, the claims appended hereto are intended to encompass other embodiments which fall within the spirit of the invention.

What is claimed is:

1. An improved method of melting metal scrap in a molten melting media comprising:
    (a) providing a body of molten melting media in a housing for purposes of melting metal scrap therein, the housing being generally circular in cross section and having upper and lower portions;
    (b) introducing a supply of scrap metal to the melting media contained in the upper portion of said housing;
    (c) adding a supply of molten melting media to said body through a volute located in the lower portion of said housing, said adding being accomplished by action of an impeller mounted on a drive shaft extending through the upper portion of the housing, and rotating in the lower portion of the housing, the impeller having a substantially circular disc having blades extending substantially downwardly therefrom to a flat ring member having a circular shaped opening in the center thereof, the opening adapted to permit molten melting media to enter the impeller axially, the disc, blades and ring member cooperating to discharge the molten melting media therefrom radially at a relatively high velocity;
    (d) controlling the motion of the body of molten melting media and the metal scrap in the upper portion of the housing by action of vanes mounted on said shaft to create a vortex in said body for mixing said scrap in said melting media; and
    (e) removing melted scrap and molten melting media at a rate substantially commensurate with their rate of introduction to the housing, the melted scrap and molten melting media removed through an opening located in the upper portion of the housing.

2. The method according to claim 1 wherein the impeller is fabricated from a zinc borosilicate frit.

3. The method according to claim 1 wherein the upper portion of the housing is downwardly converging.

4. The method according to claim 1 wherein the metal scrap is aluminum or aluminum alloys.

5. The method according to claim 1 wherein the molten melting media is molten aluminum.

6. The method according to claim 1 wherein the temperature of the melting media being added to said body is in the range of 1325° to 1475° F.

7. In an improved method of melting metal scrap in a recirculating system having a heating bay and a pumping bay wherein molten melting media is circulated from the heating bay to the pumping bay and back to the heating bay, the pumping bay having a housing having upper and lower portions therein of generally circular cross section, the upper portion containing a body of molten melting media, the improvement comprising:
    (a) introducing a supply of scrap metal to the melting media contained in the upper portion of said housing;
    (b) adding a supply of molten melting media to said body through a volute located in the lower portion of said housing, said adding being accomplished by action of an impeller mounted on a drive shaft extending through the upper portion of the housing, and rotating in the lower portion of the housing, the impeller fabricated from a zinc borosilicate frit;
    (c) controlling the flow motion of the body of molten melting media and the metal scrap in the upper portion of the housing by action of vanes mounted on said shaft to create a vortex in said body for mixing said scrap in said melting media; and
    (d) removing melted scrap and molten melting media at a rate substantially commensurate with their rate of introduction to the housing, the melted scrap and molten melting media removed through an opening located in the upper portion of the housing.

8. An improved method of melting aluminum scrap in molten aluminum comprising:
    (a) providing a body of molten aluminum in a housing for purposes of melting aluminum scrap therein, the housing being generally circular in cross section and having upper and lower portions, the upper portion having a downwardly converging wall;
    (b) introducing a supply of scrap aluminum metal to the molten aluminum contained in the upper portion of said housing;
    (c) adding supply of molten aluminum at a temperature in the range of 1325° to 1475° F. to said body through a volute located in the lower portion of said housing, said adding being accomplished by action of an impeller mounted on a drive shaft extending through the upper portion of the housing, and rotating in the lower portion of the housing, the impeller fabricated from a zinc borosilicate frit and having a substantially circular disc having blades extending substantially downwardly therefrom to a flat ring member having a circular shaped opening in the center thereof, the opening adapted to permit molten melting media to enter the impeller axially, the disc, blades and ring member cooperating to discharge the molten melting media therefrom radially at a relatively high velocity;

(d) controlling the flow motion of the body of molten aluminum and the aluminum scrap in the upper portion of the housing by action of vanes mounted on said shaft to create a vortex in said body for mixing said scrap in said molten aluminum; and (e) removing melted scrap and molten melting media at a rate substantially commensurate with their rate of introduction to the housing, the melted scrap and molten melting media removed through an opening located in the upper portion of the housing.

* * * * *